United States Patent
Park et al.

(10) Patent No.: US 11,510,149 B2
(45) Date of Patent: Nov. 22, 2022

(54) CLOSED LOOP POWER CONTROL FOR BEAM SPECIFIC UPLINK TRAFFIC TRANSMISSION

(71) Applicant: Nokia Technologies Oy, Espoo (FI)

(72) Inventors: Dan Park, Yongin (KR); Yuantao Zhang, Beijing (CN); Yi Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/758,756

(22) PCT Filed: Nov. 10, 2017

(86) PCT No.: PCT/CN2017/110392
§ 371 (c)(1),
(2) Date: Apr. 23, 2020

(87) PCT Pub. No.: WO2019/090663
PCT Pub. Date: May 16, 2019

(65) Prior Publication Data
US 2020/0344698 A1  Oct. 29, 2020

(51) Int. Cl.
*H04W 52/14* (2009.01)
*H04W 52/08* (2009.01)
(Continued)

(52) U.S. Cl.
CPC ......... *H04W 52/146* (2013.01); *H04W 52/08* (2013.01); *H04W 52/241* (2013.01); *H04W 52/325* (2013.01); *H04W 52/40* (2013.01)

(58) Field of Classification Search
CPC ................. H04W 52/00–60; H04W 52/04–60
See application file for complete search history.

(56) References Cited

U.S. PATENT DOCUMENTS

2013/0128833 A1  5/2013  Lee et al.
2014/0098761 A1*  4/2014  Lee .................... H04W 72/005
370/329
(Continued)

FOREIGN PATENT DOCUMENTS

CN  103891161 A  6/2014

OTHER PUBLICATIONS

3GPP TSG RAN WG1 Meeting 90bis R1-1717692 Prague, CZ Oct. 9-13, 2017 (Year: 2017).*

(Continued)

*Primary Examiner* — Raymond S Dean
(74) *Attorney, Agent, or Firm* — Harrington & Smith (57) ABSTRACT

A user equipment that supports a first set of beams accumulates transmit power control (TPC) commands to generate an accumulated correction factor during communication between the user equipment and a base station that supports a second set of beams. The user equipment is configured to use a first subset of the first set of beams during the communication and the base station is configured to use a second subset of the second set of beams during the communication. The user equipment detects a change in the first subset or the second subset. The user equipment resets the accumulated correction factor in response to detecting the change. In some cases, the user equipment generates a plurality of correction factors for a corresponding plurality of closed-loop processes. The user equipment resets some or all of the plurality of correction factors in response to detecting the change.

20 Claims, 8 Drawing Sheets

(51) Int. Cl.
  *H04W 52/24* (2009.01)
  *H04W 52/32* (2009.01)
  *H04W 52/40* (2009.01)

(56) References Cited

U.S. PATENT DOCUMENTS

2018/0124625 A1* 5/2018 Luo .............. H04L 5/0035
2019/0268056 A1* 8/2019 Wang ............ H04B 7/0695
2020/0288404 A1* 9/2020 Nory ............ H04W 52/146

OTHER PUBLICATIONS

"3rd Generation Partnership Project; Technical Specification Group Radio Access Network; NR; Radio Resource Control (RRC); Protocol specification (Release 15 )", 3GPP TS 38.331, V0.1.0, Oct. 2017, pp. 1-42.

"3rd Generation Partnership Project; Technical Specification Group Radio Access Network; NR; Physical layer procedures for control (Release 15)", 3GPP TS 38.213, V1.0.0, Sep. 2017, pp. 1-16.

"3rd Generation Partnership Project; Technical Specification Group Radio Access Network; NR; Physical layer procedures for data (Release 15)", 3GPP TS 38.214, V1.0.0, Sep. 2017, pp. 1-32.

International Search Report and Written Opinion received for corresponding Patent Cooperation Treaty Application No. PCT/CN2017/110392, dated Jan. 25, 2018, 8 pages.

"On UL Power Control", 3GPP TSG RAN WG1 Meeting 90bis, R1-1717692, Agenda : 7.6.1, Samsung, Oct. 9-13, 2017, pp. 1-6.

"On NR Power Control", 3GPP TSG RAN WG1 Meeting NR#3, R1-1715454, Agenda : 6.7.1, ZTE, Sep. 18-21, 2017, 8 pages.

"On NR Power Control", 3GPP TSG RAN WG1 Meeting #90bis, R1-1717438, Agenda : 7.6.1, ZTE, Oct. 9-13, 2017, 6 pages.

"On Power Control Processes for Multi Beam Transmission in NR", 3GPP TSG RAN WG1 Meeting #89, R1-1708361, Agenda : 7.1.9, InterDigital Inc., May 15-19, 2017, 4 pages.

* cited by examiner

CLOSED LOOP POWER CONTROL FOR BEAM SPECIFIC UPLINK TRAFFIC TRANSMISSION

RELATED APPLICATION

This application claims priority to PCT Application No. PCT/CN2017/110392, filed on Nov. 10, 2017, which is incorporated herein by reference in its entirety.

BACKGROUND

Wireless communications that operate according to standards such as the Fifth Generation (5G) standards defined by the Third Generation Partnership Project (3GPP) support communication over an air interface using multiple spatial channels for transmission or reception. The spatial channels are typically referred to as beams. For example, base stations that operate according to the 5G standards can support eight beams that have transmission or reception patterns oriented along different directions. For another example, user equipment that operate according to the 5G standards can support four beams that have transmission or reception patterns oriented along different directions. Communication between a base station and a user equipment utilizes a subset of the available beams, e.g., a base station uses a subset of four beams and the user equipment uses a subset of two beams to support uplink or downlink transmissions.

Power control algorithms are used to manage radio resources that support communication between base stations and user equipment. For example, uplink power control is used to adjust the transmission power of the user equipment to provide sufficient power to ensure reliable communication between the user equipment and a serving base station while minimizing interference with other users and, in some cases, maximizing battery life in the user equipment. Power control algorithms are therefore required to adapt to changing radio channel conditions such as path loss, shadowing, and fast fading. In closed loop power control algorithms, the base station transmits transmit power control (TPC) commands to the user equipment, which uses the received TPC commands to adjust its transmission power. The TPC commands indicate a relative change in the transmission power of the user equipment, e.g., a TPC command can indicate that the user equipment should increase its transmission power, decrease its transmission power, or keep the transmission power the same. The TPC command does not indicate the actual transmission power that should be used by the user equipment. The transmission power of the user equipment is determined (in part) based on a correction value that determined by accumulating TPC commands over transmission time intervals (TTIs).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

User equipment implement uplink transmission power control to determine transmission power adjustments for each of multiple spatial channels (or beams) that are supported by the user equipment. The transmission powers for the beams are determined by parameters for the user equipment, measurements, and an accumulated correction factor. Examples of the parameters and measurements include a maximum allowed transmit power, a number of physical resource blocks, a target signal-to-noise ratio (SNR), a path loss compensation factor, a downlink path loss estimate, a reference symbol received power (RSRP), a modulation and coding scheme, and the like. The correction factor is determined by accumulating transmit power control (TPC) commands for communication between a base station and the user equipment over multiple transmission time intervals (TTIs). The accumulated correction factor is updated by the TPC commands using downlink control information (DCI) signaling. The number of closed loop power control processes that are available for use by the user equipment is determined by a number of DCI fields that are allocated to the closed loop processes. For example, the 3GPP Long Term Evolution (LTE) standards specify that up to two separate closed loop processes with TPC accumulation are supported by a single DCI field. Increasing the number of supported closed loop processes requires increasing the number of DCI fields used to convey power control information. Thus, the overhead in DCI signaling becomes excessive if too many closed loop processes are configured. Consequently, the number of closed loop processes is limited to a predetermined number, such as two closed loop processes, to avoid an excessive increase in the size of the DCI signaling between the user equipment and the base station.

Beam configurations used by the base station or the user equipment change in response to changing environmental conditions, movement of the user equipment, or other variable factors. The base station and the user equipment are configured to perform transmission power adjustment for the spatial channels based on the beam configurations. Thus, the base station configures new values or settings for power control parameters and measurements in response to changes in the beam configurations. The correction factor for the user equipment does not necessarily reflect conditions for the new beam configuration because the correction factor for the user equipment was accumulated based on the TPC commands received while communicating using the original beam configuration. The beams in the new beam configuration should therefore be connected to a new process for accumulating the correction factors. However, the limitation on the number of closed loop processes makes it impossible to add new closed loop processes, and corresponding correction factors and TPC commands, in response to a change in a beam configuration. For example, if the user equipment is able to support four beams, transmission power control could be implemented for all of the spatial channels by configuring four sets of parameters, four sets of measurements, and four separate closed loop processes. In that case. a set of parameters, a set of measurements, and a closed loop process would be linked to each beam. However, the DCI overhead for the required TPC commands would be doubled relative to the DCI overhead in the current LTE standard design. Furthermore, some user equipment are able to support larger numbers of beams, in which case the DCI overhead would be even larger. For example, if a user equipment is able to support 12 beams, providing closed loop power control processes for each beam would increase the DCI overhead by a factor of 12 relative to the current LTE standard design.

In order to support closed loop power control between a base station that supports multiple beams and a user equipment that supports multiple beams, without violating a constraint on a number of closed loop processes, the user equipment resets a previously accumulated correction factor in response to a change in a configuration of a first subset of beams supported by the base station and/or a second subset of beams supported by the user equipment. Some embodiments of the user equipment reset the accumulated correction factor in response to a change in a subset of candidate uplink beams at the base station. The change in the subset of candidate uplink beams is signaled to the user equipment using radio resource control (RRC) reconfiguration messages. The reset can be performed on all of the closed loop processes supported by the user equipment or on a subset of the closed loop processes that are associated with changes in the beam configurations used by the base station. Some embodiments of the user equipment reset the accumulated correction factor in response to a change in a subset of candidate beams at the user equipment. In this case, the reset is performed without notifying the base station that the correction factor has been reset. The user can perform the reset on all of the closed loop processes supported by the user equipment or on a subset of the closed loop processes that are associated with changes in the beam configurations at the user equipment. After reset, the correction factor is accumulated on the basis of newly received TPC commands.

Figure 1:
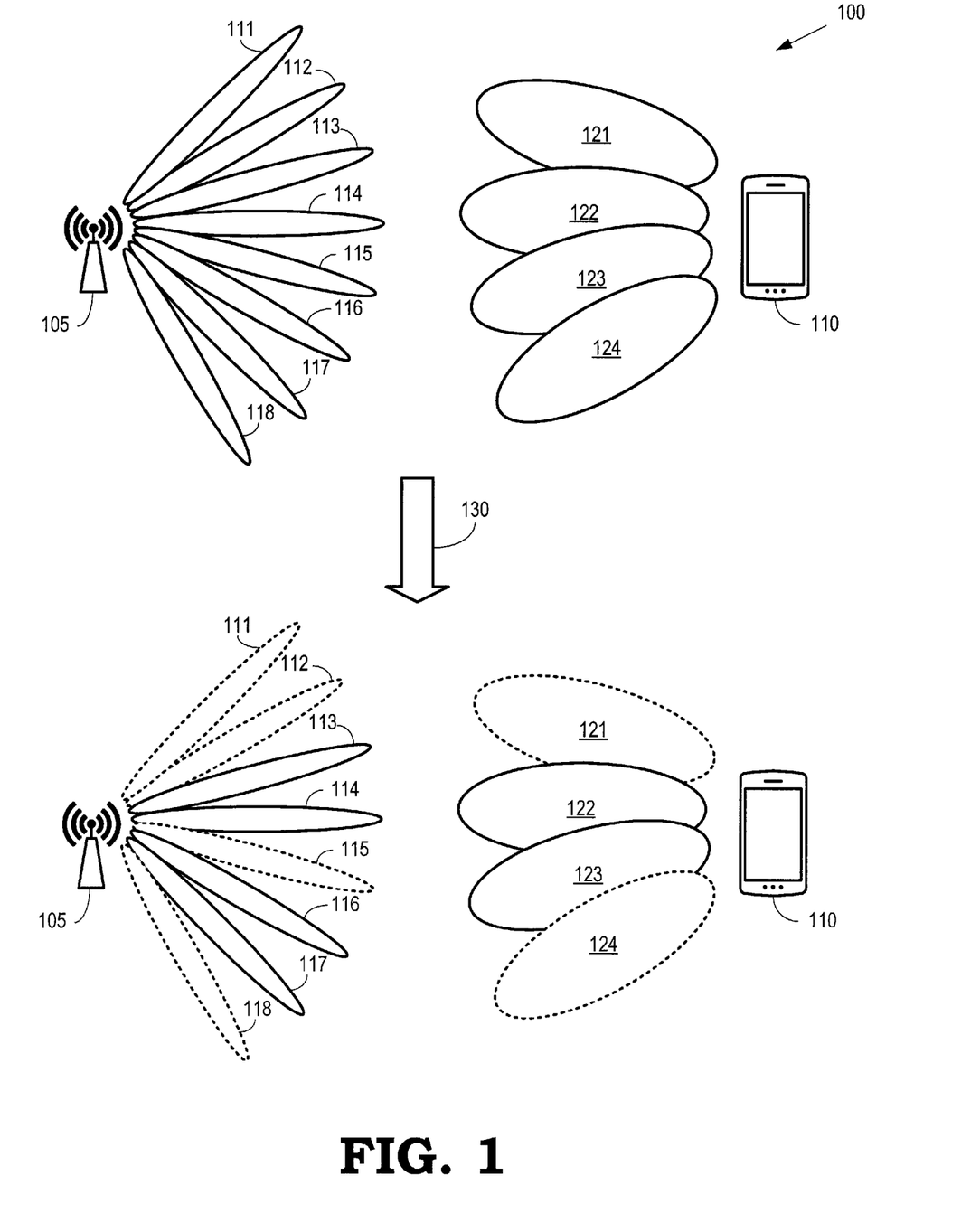
FIG. 1 illustrates a wireless communication system according to some embodiments.

FIG. 1 illustrates a wireless communication system 100 according to some embodiments. The wireless communication system 100 includes one or more base stations 105 that support wireless connectivity over air interfaces with one or more user equipment 110. In the interest of clarity, a single base station 105 and a single user equipment 110 are shown in FIG. 1, although some embodiments of the wireless communication system 100 include more base stations that are configured to provide wireless connectivity to more user equipment. Some embodiments of the base station 105 are implemented as a 5G gigabit NodeB (gNB) in accordance with 5G standards defined by the 3GPP. The user equipment 110 is therefore also configurable to operate in accordance with 5G standards.

The base station 105 supports a set of beams for transmitting or receiving signals in corresponding directions. In the illustrated embodiment, the set of beams includes eight beams 111, 112, 113, 114, 115, 116, 117, 118, which are collectively referred to herein as "the beams 111-118." For example, the base station 105 can implement multiple antennas and the phases associated with the antennas are adjustable to form beams that are directed towards configurable directions. The user equipment 110 is also able to support a set of beams for transmitting and receiving signals in corresponding directions. In the illustrated embodiment, the set of beams includes four beams 121, 122, 123, 124, which are collectively referred to herein as "the beams 121-124."

The base station 105 and the user equipment 110 are configured to use subsets of the beams 111-119, 121-124 for uplink communication during a time interval, as indicated by the arrow 130. In some embodiments, the subsets of the beams 111-118, 121-124 are used to support wireless communication on a physical uplink shared channel (PUSCH). For example, the base station 105 is configured to use a subset including the beams 113, 114, 116, 117 for uplink communication, as indicated by the solid lines, and the remaining beams 111, 112, 115, 118 are not used for uplink communication, as indicated by the dashed lines. The user equipment 110 is configured to use a subset including the beams 122, 123 for uplink communication, as indicated by the solid lines, and the remaining beams 121, 124 are not used for uplink communication, as indicated by the dashed lines. One or more of the beams within the subsets are used concurrently for the uplink transmission at the base station 105 or the user equipment 110.

The wireless communication system 100 implements closed-loop power control processes. For example, closed-loop power control processes are used to control the transmission power of the user equipment 110 based on TPC commands received from the base station 105. The wireless communication system 100 supports a predetermined number of closed-loop power control processes, e.g., the base station 105 and the user equipment 110 are able to support up to two closed-loop power control processes in some cases. The closed-loop power control processes are configured using radio resource control (RRC) signaling. The transmit power ($P_{PUSCH}$) of the user equipment 110 is determined according to:

$$P_{PUSCH,c}(i) = \min \begin{Bmatrix} P_{CMAX,c}(i), \\ 10\log_{10}(M_{PUSCH,c}(i)) + P_{0,c}(j) + \\ \alpha_c(j) \cdot PL_c(k) + \Delta_{TF,c}(i) + f_c(i, l) \end{Bmatrix} \quad (1)$$

where $P_{CMAX}$ is a maximum allowed transmit power, $M_{PUSCH}$ is a number of physical resource blocks (PRB), $P_0$ is a parameter that is specific to the base station 105 and the user equipment 110 (which is also used to control a target signal-to-noise ratio, SNR), α is a path loss compensation factor that can be signaled by RRC signaling, PL is a downlink path loss estimate that is determined by the user equipment 110 based on a reference symbol received power (RSRP), A indicates a modulation and coding scheme used by the base station 105 and the user equipment 110. The value of i indicates the closed-loop process, which can be configured for the user equipment 110 using a PUSCH beam indication (if present) for grant based PUSCH. The value of k is indicated by a beam indication for the PUSCH (if present) and the value of j can be configured using a PUSCH beam indication (if present) for grant based PUSCH.

The correction factor, f, is determined by the user equipment 110 based on received and accumulated TPC commands. For example, the correction factor, f, is calculated as:

$$f(i) = f(i-1) + \delta_{PUSCH}(1 - K_{PUSCH}) \quad (2)$$

where $\delta_{PUSCH}$ is a correction value that is also referred to as a TPC command and $K_{PUSCH}$ indicates a number of transition time intervals. The user equipment 110 therefore accumulates the correction factor over multiple transition time intervals by accumulating the TPC commands received from the base station 105.

Power control can also be implemented for the uplink control channel according to:

$$P_{PUCCH}(i) = \min\left\{\begin{array}{c} P_{CMAX,c}(i) \\ P_{0\_PUCCH}(b) + PL_c(k) + \Delta_{F\_PUCCH}(F) + \Delta_{PUCCH_{TF},c}(i) + g(i) \end{array}\right\} \quad (3)$$

where g is the accumulated correction factor for PUCCH, which is accumulated on the basis of received TPC commands. In the interest of clarity, power control is discussed in the context of the PUSCH but the techniques disclosed herein are equally applicable to power control algorithms that are applied to the PUCCH.

An example of the configuration of the base station 105 and the user equipment 110 for beam-specific uplink power control, e.g., PUSCH power control is presented in Table 1.

TABLE 1

| Uplink Beam Index | Path loss measurement RS index | Open-loop set index | Closed-loop process index |
|---|---|---|---|
| 0 | CSI-RS #0 | 0 | 0 |
| 1 | CSI-RS #1 | 1 | 0 |
| 2 | SSB #0 | 2 | 1 |
| 3 | SSB #1 | 3 | 1 |

The uplink Beam Index is used to indicate beams that are allocated to uplink signaling. In some embodiments, the uplink Beam Index indicates up to two of the beams 121-124 that are allocated to uplink signaling. In other embodiments, the uplink Beam Index indicates up to four combinations of the beams 111-118 and the beams 121-124 that are used for uplink transmission from the user equipment 110 for reception at the base station 105. The Beam Index in Table 1 indicates combinations of the beams 111-118, 121, 124, but the Beam Index is used to indicate up to two of the beams 121-124 in other embodiments. The path loss measurement reference signal (RS) index includes a channel state information reference signal (CSI-RS) identifier or an SSB identifier that indicates the beam 111-118 that is allocated to the corresponding uplink Beam Index. The open-loop set index indicates the beams 121-124 that are configured for open-loop power control. The closed-loop process index indicates the closed-loop power control process that is used to control power for uplink transmissions associated with a corresponding combination of a subset of the beams 111-118 and a subset of the beams 121-124. The combinations of the beams 111-118 and the beams 121-124 that are used for uplink transmissions are referred to herein as "beam pairs."

Typically, the number of beams 111-118 indicated by the CSI-RS or SSB indices is larger than the number of reference signals (RS) of beams that are configured or selected as candidates for path loss measurement RS, and the number of closed-loop processes is smaller than the number of beams selected for path loss measurement RSs. In the illustrated embodiment, the eight beams 111-118 are configured with corresponding CSI-RS indices. Based on level 1 RSRP measurements, the user equipment 110 reports four candidate beams for uplink transmission, e.g., the beams 113, 114, 116, 117. The user equipment 110 are configured with open-loop parameter set for uplink transmission. Different sets of parameters are configured for different value of k. Closed-loop processes are also configured for k=(0, 1) and k=(2, 3). In the example depicted in FIG. 1 and Table 1, k=(0, 1) indicates the beam 122 at user equipment 110, and k=(2, 3) indicates the beam 123 at user equipment 110. The user equipment 110 changes the candidate beam configurations in response to changes in the channel status between the user equipment 110 and the base station 105. In that case, different sets of open-loop parameters are configured for each value of k to support the uplink transmission beam-specific configuration of the user equipment 110.

The user equipment 110 is also configured to reset parameters of the closed-loop processes including the accumulated correction factors. For example, the user equipment 110 can reset the accumulated correction factor, f, for the PUSCH or the accumulated correction factor, g, for the PUCCH. Some embodiments of the user equipment 110 accumulate TPC commands to generate an accumulated correction factor during communication between the user equipment 110 and the base station 105 according to an initial configuration of the beams 111-118, 121-124. The user equipment 110 subsequently detects a change in a configuration of the beams 111-118 associated with the base station 105, the beams 121-124 associated with the user equipment 110, or a combination thereof. The user equipment 110 then resets the accumulated correction factor in response to detecting the change.

Figure 2:
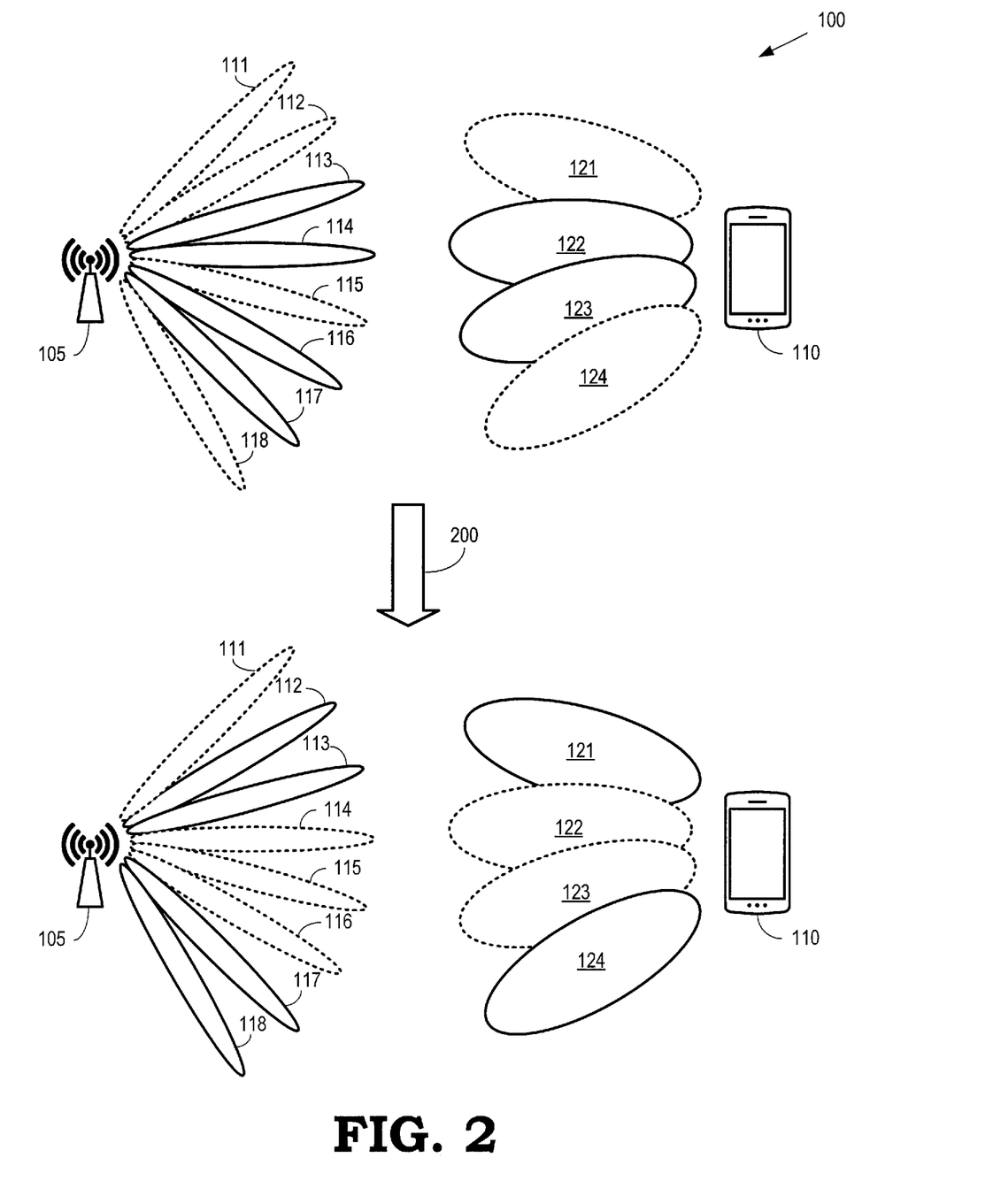
FIG. 2 illustrates reconfiguration of subsets of the beams utilized by the base station and the user equipment in the wireless communication system according to some embodiments.

FIG. 2 illustrates reconfiguration of subsets of the beams utilized by the base station 105 and the user equipment 110 in the wireless communication system 100 according to some embodiments. Initially, the base station 105 is configured to use a subset including the beams 113, 114, 116, 117 for uplink communication during a time interval, as indicated by the solid lines, and the remaining beams 111, 112, 115, 118 are not used for uplink communication, as indicated by the dashed lines. The user equipment 110 is configured to use a subset including the beams 122, 123 for uplink communication, as indicated by the solid lines, and the remaining beams 121, 124 are not used for uplink communication, as indicated by the dashed lines. One or more of the beams within the subset are concurrently used for uplink transmission at the base station 105 or the user equipment 110.

The initial configuration of the base station 105 and the user equipment 110 for beam-specific uplink power control, e.g., PUSCH power control, is presented in Table 2.

TABLE 2

| Uplink Beam Index | Path loss measurement RS index | Open-loop set index | Closed-loop process index |
|---|---|---|---|
| 0 | CSI-RS #1 | 2 | 0 |
| 1 | CSI-RS #2 | 2 | 0 |
| 2 | CSI-RS #4 | 3 | 1 |
| 3 | CSI-RS #5 | 3 | 1 |

Both the base station 105 and the user equipment 110 reconfigure the subsets of the beams 111-118, 121-124 that are used to support uplink communication, as indicated by the arrow 200. The base station 105 is reconfigured to use a subset including the beams 112, 113, 117, 118 for uplink communication, as indicated by the solid lines, and the remaining beams 111, 114-116 are not used for uplink communication, as indicated by the dashed lines. The user equipment 110 is configured to use a subset including the beams 121, 124 for uplink communication, as indicated by the solid lines, and the remaining beams 122, 123 are not used for uplink communication, as indicated by the dashed lines. The reconfigured base station 105 and user equipment 110 are presented in Table 3.

TABLE 3

| Uplink Beam Index | Path loss measurement RS index | Open-loop set index | Closed-loop process index |
|---|---|---|---|
| 0 | CSI-RS #0 | 0 | 0 |
| 1 | CSI-RS #1 | 0 | 0 |
| 2 | CSI-RS #5 | 1 | 1 |
| 3 | CSI-RS #6 | 1 | 1 |

In this case, the base station 105 transmits an RRC reconfiguration message to the user equipment 105 to inform the user equipment 105 that the beam configuration has been modified, which indicates that settings for uplink beam management are to be changed at the user equipment 110. There is also a high likelihood that RRC configuration for uplink power control should also be changed. The user equipment 110 resets accumulated correction factors used to determine an uplink transmission power in response to receiving the RRC reconfiguration message from the base station 105. The accumulated correction factors associated with both of the closed-loop process indices 0, 1 are reset because beams associated with both closed-loop processes have been reconfigured. Reset of the accumulative power control for the closed-loop also results in changes of the corresponding downlink RS (e.g., as indicated by the different CSI-RS indices) that is used for path loss measurements. In some embodiments, all closed-loop power control is reset in response to the changes. In Tables 2 and 3, when the open-loop set index value is changed in response to the RRC reconfiguration, the change in the value indicates that either the index of open-loop set (j) in the equation (1) or the values of open loop parameters in equations (1) and (2) have changed.

Figure 3:
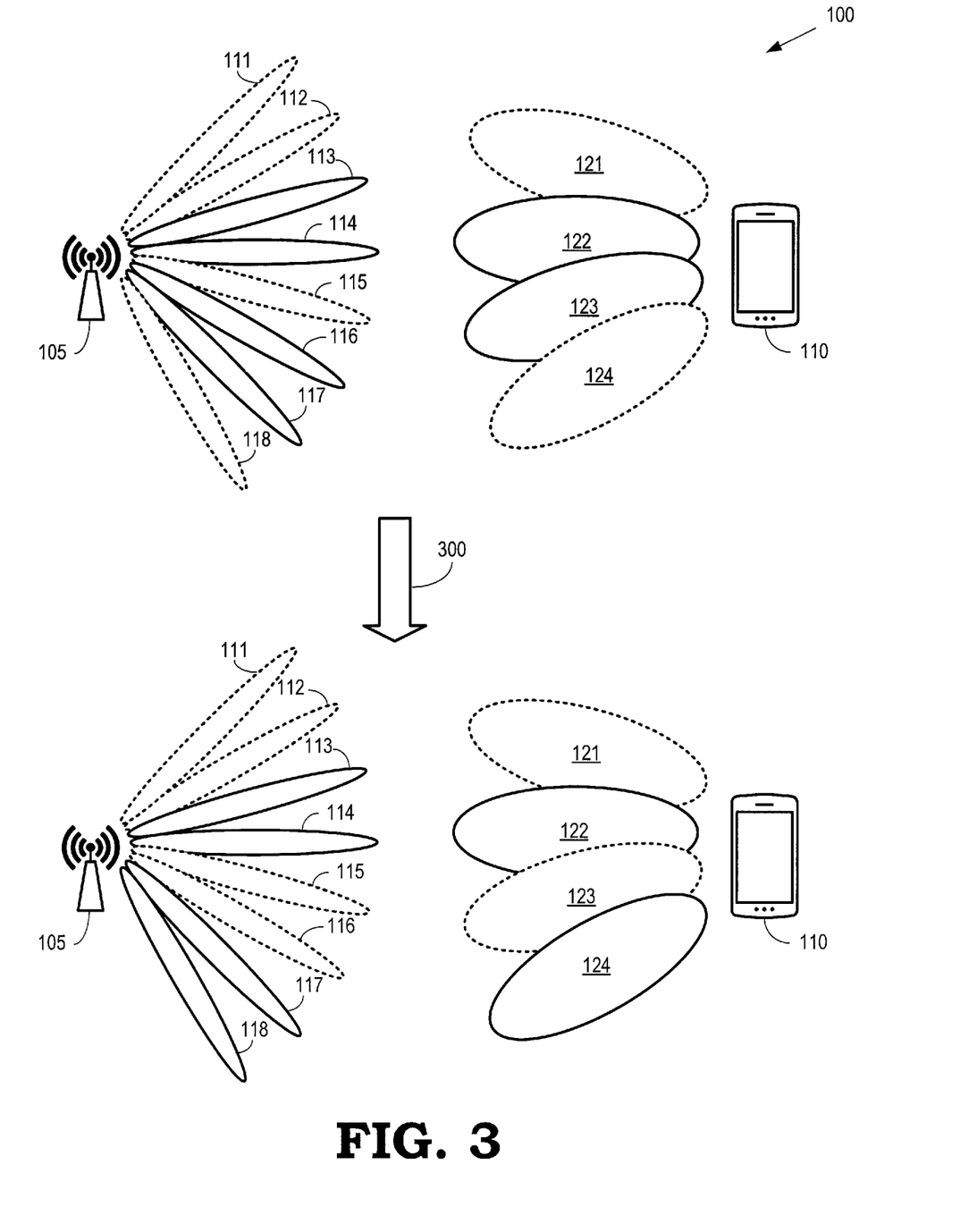
FIG. 3 illustrates a partial reconfiguration of subsets of the beams utilized by the base station and the user equipment in the wireless communication system according to some embodiments.

FIG. 3 illustrates a partial reconfiguration of subsets of the beams utilized by the base station 105 and the user equipment 110 in the wireless communication system 100 according to some embodiments. Initially, the base station 105 is configured to use a subset including the beams 113, 114, 116, 117 for uplink communication during a time interval, as indicated by the solid lines, and the remaining beams 111, 112, 115, 118 are not used for uplink communication, as indicated by the dashed lines. The user equipment 110 is configured to use a subset including the beams 122, 123 for uplink communication, as indicated by the solid lines, and the remaining beams 121, 124 are not used for uplink communication, as indicated by the dashed lines. One or more of the beams within the subset are concurrently used for the uplink transmission at the base station 105 or the user equipment 110. The initial configuration of the base station 105 and the user equipment 110 for beam-specific uplink power control, e.g., PUSCH power control, is presented in Table 2.

The base station 105 reconfigures the subsets of the beams 111-118, 121-124 that are used to support uplink communication with the user equipment 110 during a time interval, as indicated by the arrow 300. The base station 105 is reconfigured to use a subset including the beams 113, 114, 117, 118 for uplink communication, as indicated by the solid lines, and the remaining beams 111, 112, 115, 116 are not used for uplink communication, as indicated by the dashed lines. The user equipment 110 is configured to use a subset including the beams 122, 124 for uplink communication, as indicated by the solid lines, and the remaining beams 121, 123 are not used for uplink communication, as indicated by the dashed lines. One or more of beams within the subset are concurrently used for the uplink transmission at the base station 105 or the user equipment 110. The reconfigured base station 105 and user equipment 110 are presented in Table 4.

In the embodiment shown in FIG. 3, the reconfigured beams are associated with a single closed-loop process index 0. The beams associated with the closed-loop process index 1 are not reconfigured. Consequently, the user equipment 110 does not necessarily reset the accumulated correction factors for all of the closed-loop processes, although this is done in some embodiments. In the illustrated embodiment, the user equipment 110 resets the accumulated correction factor associated with the closed-loop process index 0 and does not reset the accumulated correction factor associated with the closed-loop process index 1. Reset of the accumulative power control for the closed-loop also results in changes of the corresponding downlink RS (e.g., as indicated by the different CSI-RS indices) that is used for path loss measurements. In some embodiments, all closed-loop power control for the closed-loop process index 0 is reset in response to the changes.

TABLE 4

| Uplink Beam Index | Path loss measurement RS index | Open-loop set index | Closed-loop process index |
|---|---|---|---|
| 0 | CSI-RS #0 | 0 | 0 |
| 1 | CSI-RS #1 | 0 | 0 |
| 2 | CSI-RS #5 | 1 | 1 |
| 3 | CSI-RS #6 | 1 | 1 |

Figure 4:
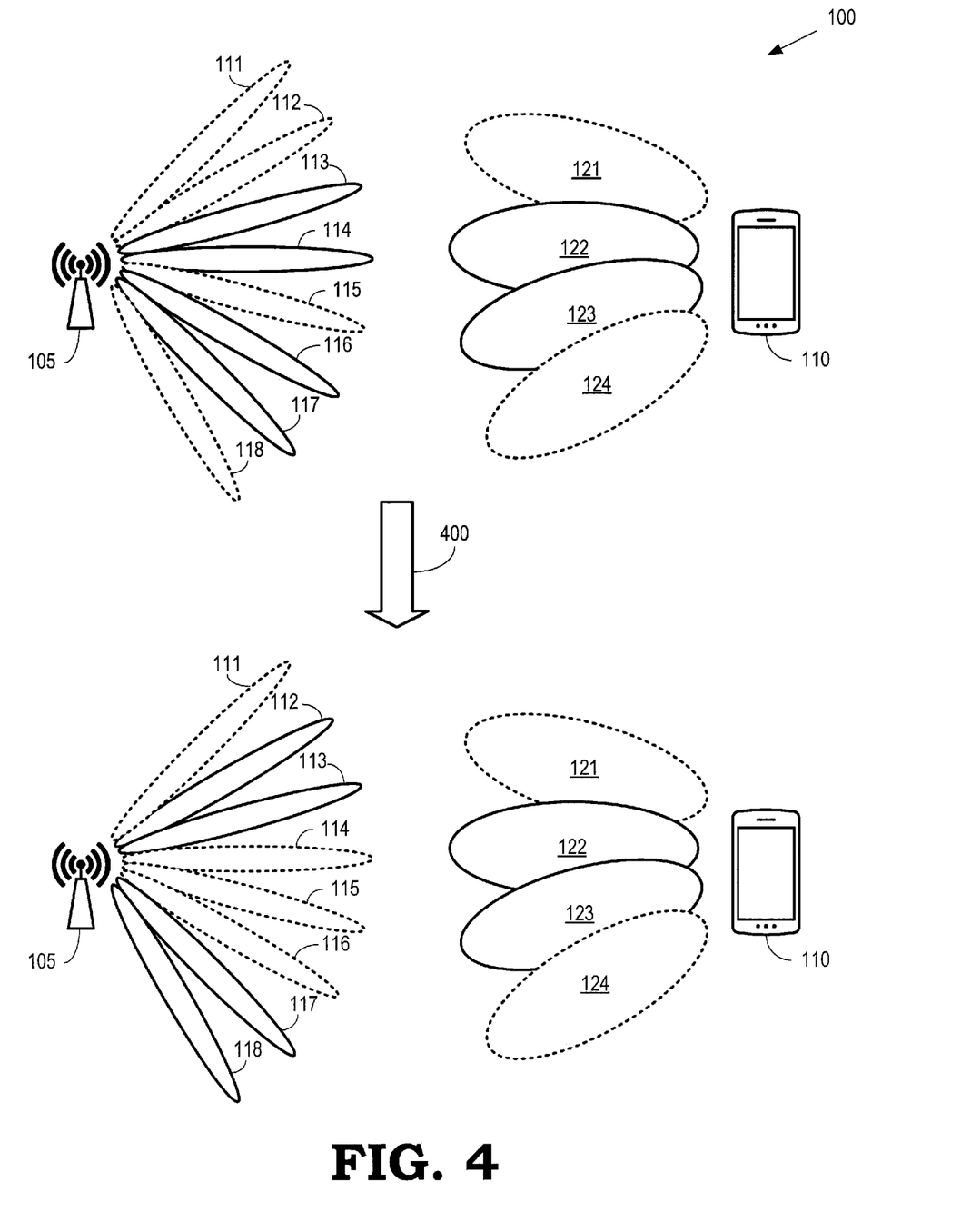
FIG. 4 illustrates reconfiguration of subsets of the beams utilized by the base station in the wireless communication system according to some embodiments.

FIG. 4 illustrates reconfiguration of subsets of the beams utilized by the base station 105 in the wireless communication system 100 according to some embodiments. Initially, the base station 105 is configured to use a subset including the beams 113, 114, 116, 117 for uplink communication, as indicated by the solid lines, and the remaining beams 111, 112, 115, 118 are not used for uplink communication, as indicated by the dashed lines. The user equipment 110 is configured to use a subset including the beams 122, 123 for uplink communication, as indicated by the solid lines, and the remaining beams 121, 124 are not used for uplink communication, as indicated by the dashed lines. One or more of beams within the subset are concurrently used for the uplink transmission at either the base station 105 or the user equipment 110. The initial configuration of the base station 105 and the user equipment 110 for beam-specific uplink power control, e.g., PUSCH power control, is presented in Table 2.

The base station 105 reconfigured the subset of the beams 111-118 that are used to support uplink communication, as indicated by the arrow 300. The base station 105 is reconfigured to use a subset including the beams 113, 114, 117, 118 for uplink communication, as indicated by the solid lines, and the remaining beams 111, 112, 115, 116 are not used for uplink communication, as indicated by the dashed lines. The user equipment 110 does not reconfigure the subsets of the beams 121-124. The reconfigured base station 105 and user equipment 110 are presented in Table 5.

TABLE 5

| Uplink Beam Index | Path loss measurement RS index | Open-loop set index | Closed-loop process index |
| --- | --- | --- | --- |
| 0 | CSI-RS #0 | 2 | 0 |
| 1 | CSI-RS #1 | 2 | 0 |
| 2 | CSI-RS #5 | 3 | 1 |
| 3 | CSI-RS #6 | 3 | 1 |

In the embodiment shown in FIG. 4, the base station 105 does not send a message to the user equipment 110 for uplink beam management because there are no changes to the subset of the beams 121-124 used by the user equipment 110 for uplink transmission. In some cases, a downlink RS is changed for beam management because the subset including the beams 113, 114, 117, 118 that are used to receive uplink transmissions has changed and thus the expected path loss, which usually includes the beam gain for both the base station beams and the user equipment beams, is likely to change. In response to receiving a message indicating that the downlink RS four path loss measurement has changed, the user equipment 110 recognizes that the base station 105 has reconfigured the subset of beams for uplink transmission (at least the set of candidate beam pairs for uplink transmission have changed) and so the user equipment 110 resets the accumulated correction factor for power control. Some embodiments of the user equipment 110 reset all closed-loop power control in response to the changes.

Figure 5:
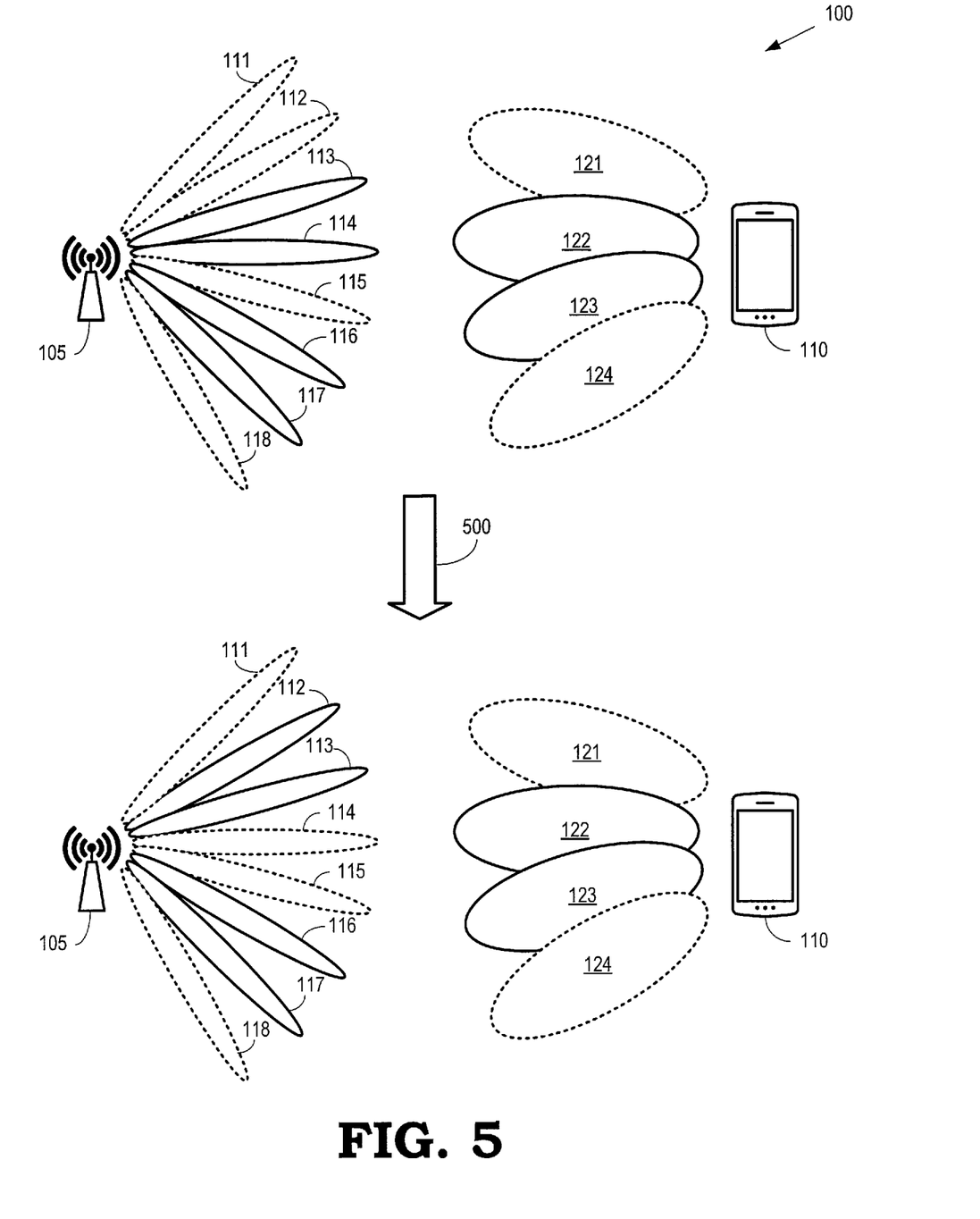
FIG. 5 illustrates a partial reconfiguration of subsets of the beams utilized by the base station in the wireless communication system according to some embodiments.

FIG. 5 illustrates a partial reconfiguration of subsets of the beams utilized by the base station 105 in the wireless communication system 100 according to some embodiments. Initially, the base station 105 is configured to use a subset including the beams 113, 114, 116, 117 for uplink communication, as indicated by the solid lines, and the remaining beams 111, 112, 115, 118 are not used for uplink communication, as indicated by the dashed lines. The user equipment 110 is configured to use a subset including the beams 122, 123 for uplink communication, as indicated by the solid lines, and the remaining beams 121, 124 are not used for uplink communication, as indicated by the dashed lines. The initial configuration of the base station 105 and the user equipment 110 for beam-specific uplink power control, e.g., PUSCH power control, is presented in Table 2.

The base station 105 reconfigured the subset of the beams 111-118 that are used to support uplink communication, as indicated by the arrow 300. The base station 105 is reconfigured to use a subset including the beams 112, 113, 116, 117 for uplink communication, as indicated by the solid lines, and the remaining beams 111, 114, 115, 118 are not used for uplink communication, as indicated by the dashed lines. The user equipment 110 does not reconfigure the subsets of the beams 121-124. The reconfigured base station 105 and user equipment 110 are presented in Table 6.

TABLE 6

| Uplink Beam Index | Path loss measurement RS index | Open-loop set index | Closed-loop process index |
| --- | --- | --- | --- |
| 0 | CSI-RS #1 | 2 | 0 |
| 1 | CSI-RS #2 | 2 | 0 |
| 2 | CSI-RS #5 | 3 | 1 |
| 3 | CSI-RS #6 | 3 | 1 |

In the embodiment shown in FIG. 5, the reconfigured beams are associated with a single closed-loop process index 1. Consequently, the user equipment 110 does not necessarily reset the accumulated correction factors for all of the closed-loop processes, although this is done in some embodiments. In the illustrated embodiment, the user equipment 110 resets the accumulated correction factor associated with the closed-loop process index 1 and does not reset the accumulated correction factor associated with the closed-loop process index 0. Reset of the accumulative power control for the closed-loop also results in changes of the corresponding downlink RS (e.g., as indicated by the different CSI-RS indices) that is used for path loss measurements. In some embodiments, all closed-loop power control for the closed-loop process index 1 is reset in response to the changes.

Figure 6:
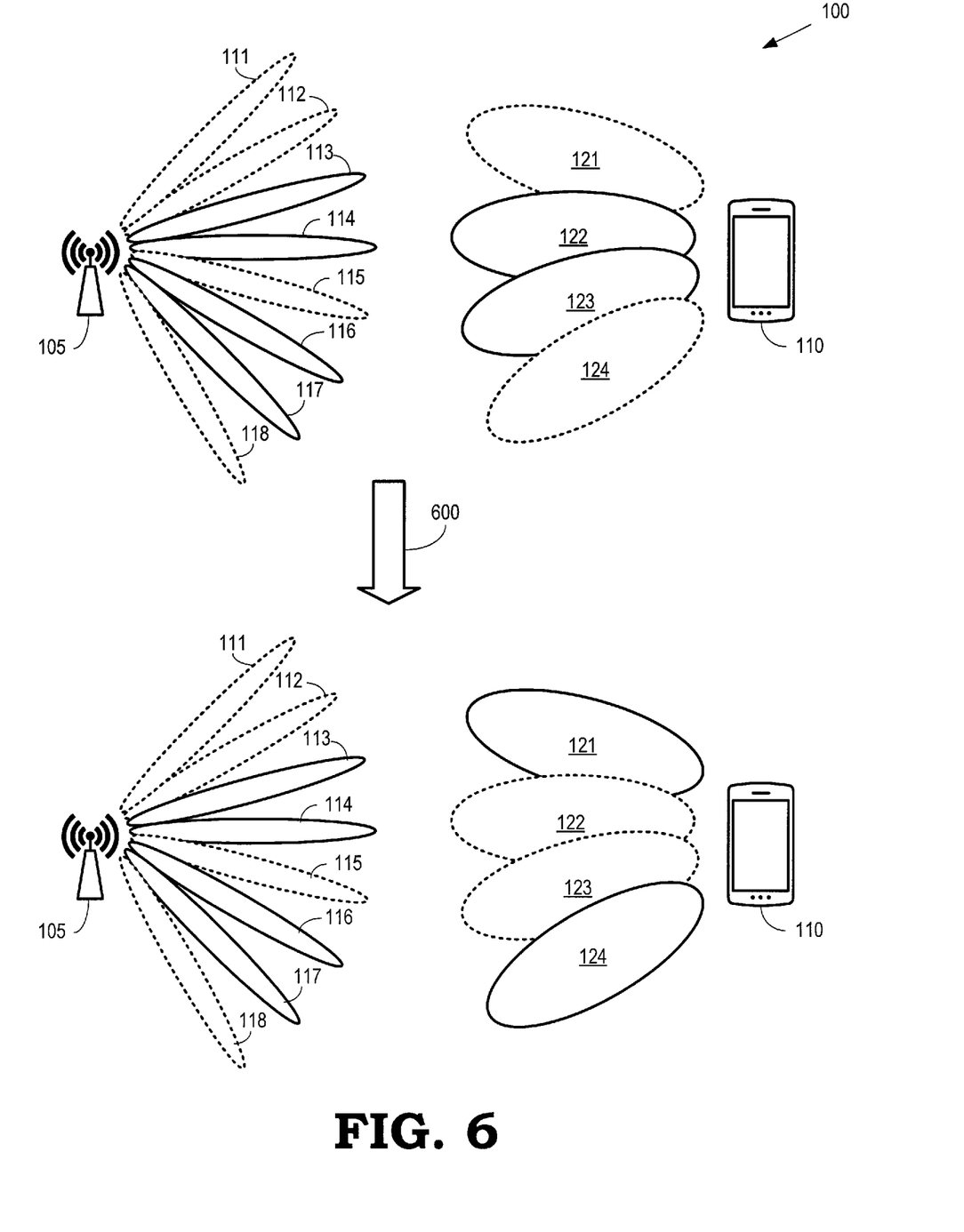
FIG. 6 illustrates reconfiguration of subsets of the beams utilized by the user equipment in the wireless communication system according to some embodiments.

FIG. 6 illustrates reconfiguration of subsets of the beams utilized by the user equipment 110 in the wireless communication system 100 according to some embodiments. Initially, the base station 105 is configured to use a subset including the beams 113, 114, 116, 117 for uplink communication, as indicated by the solid lines, and the remaining beams 111, 112, 115, 118 are not used for uplink communication, as indicated by the dashed lines. The user equipment 110 is configured to use a subset including the beams 122, 123 for uplink communication, as indicated by the solid lines, and the remaining beams 121, 124 are not used for uplink communication, as indicated by the dashed lines. The initial configuration of the base station 105 and the user equipment 110 for beam-specific uplink power control, e.g., PUSCH power control, is presented in Table 2.

The base station 105 does not reconfigure the subsets of the beams 111-118. The user equipment 110 does not reconfigure the subsets of the beams 121-124. The user equipment 110 is configured to use a subset including the beams 121, 124 for uplink communication, as indicated by the solid lines, and the remaining beams 122, 123 are not used for uplink communication, as indicated by the dashed lines. The reconfigured base station 105 and user equipment 110 are presented in Table 7.

TABLE 7

| Uplink Beam Index | Path loss measurement RS index | Open-loop set index | Closed-loop process index |
| --- | --- | --- | --- |
| 0 | CSI-RS #1 | 0 | 0 |
| 1 | CSI-RS #2 | 0 | 0 |
| 2 | CSI-RS #4 | 3 | 1 |
| 3 | CSI-RS #5 | 3 | 1 |

In the embodiment shown in FIG. 6, the base station 105 does not provide any signaling to the user equipment 110 because the change in the beam configuration at the user equipment 110 is transparent to the base station 105. However, the user equipment 110 detects the change in the "beam pair" of beams that are used by the base station 105 and the user equipment 110 for uplink transmission in response to changing the subset of beams on the side of the user equipment 110. Consequently, the user equipment 110 resets accumulative power control, including the accumulated correction factors, in response to detecting the change. Full and partial reset of accumulative power control is supported in some embodiments. The base station 105 determines that the reset occurred in response to the user equipment 110 reporting a change in the uplink beam pair in a message transmitted to the base station 105.

Figure 7:
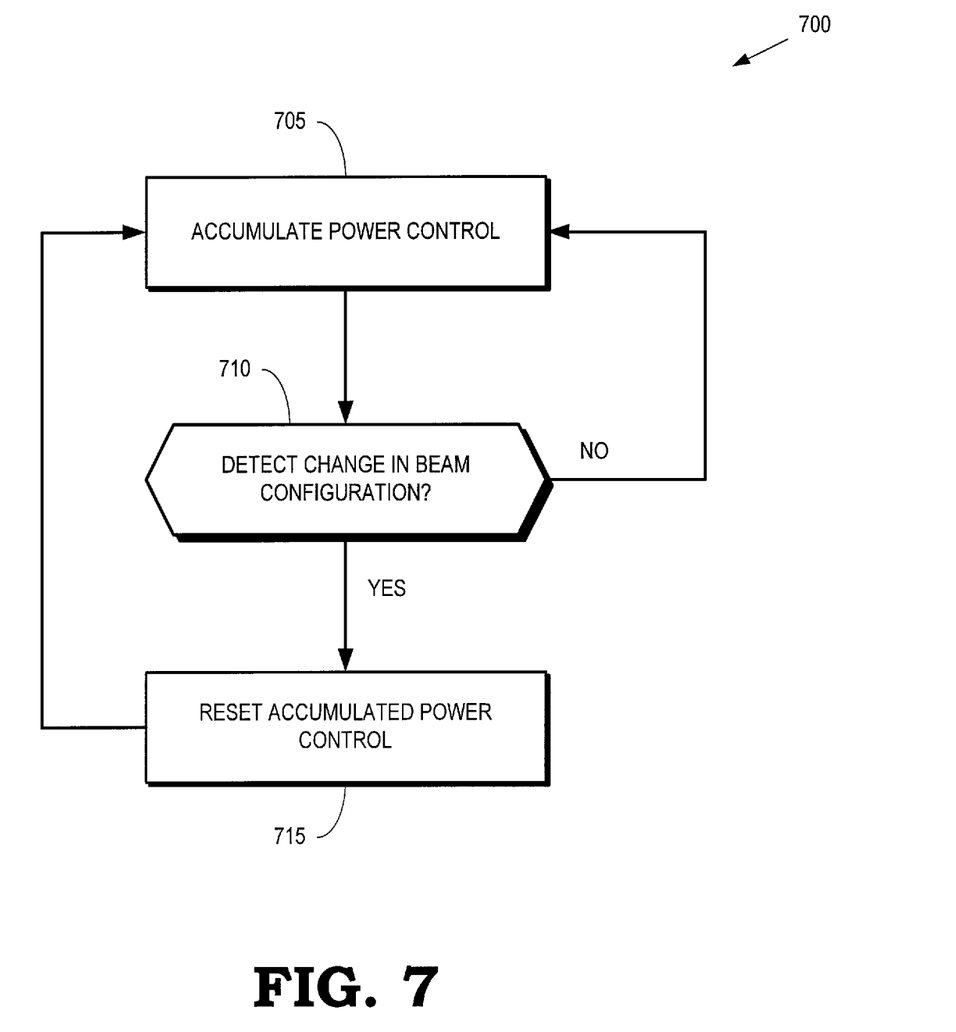
FIG. 7 is a flow diagram of a method of resetting accumulative power control commands according to some embodiments.

FIG. 7 is a flow diagram of a method 700 of resetting accumulative power control commands according to some embodiments. The method 700 is implemented in some embodiments of the wireless communication system 100 shown in FIG. 1. For example, the method 700 is implemented in some embodiments of the user equipment 110 shown in FIG. 1. The user equipment communicates with a base station over an air interface using subsets of beams supported by the user equipment and the base station. Initially, the user equipment is configured to use a first subset of the beams supported by the user equipment and the base station is configured to use a first subset of the beams supported by the base station.

At block 705, the user equipment performs accumulative power control. For example, the user equipment can dynamically adjust its uplink transmission power in response to TPC commands received from a base station. A correction factor accumulates the TPC commands to generate an accumulated correction factor that is used to determine (in part) a transmission power for the user equipment.

At decision block 710, the user equipment determines whether there has been a change in a beam configuration used by either the user equipment or the base station. Changes in the beam configuration used by the base station are signaled to the user equipment, which detects the changes based on the signaling Changes in the beam configuration used by the user equipment are known to the user equipment and additional signaling is not needed to detect the change. As long as the user equipment does not detect a change in a beam configuration, the method 700 flows back to block 705 and the user equipment continues to perform accumulative power control. In response to detecting a change in the beam configuration, the method 700 flows to block 710.

At block 715, the user equipment resets the accumulative power control for uplink transmissions. Some embodiments of the user equipment reset the accumulative power control by resetting the accumulated control factor to an initial value such as a value of zero or another predetermined value. In response to resetting the accumulated control factor, the method 700 flows back to block 705 and the user equipment continues to perform accumulative power control, e.g., by accumulating values of TPC commands beginning with the reset value of the accumulated control factor.

Figure 8:
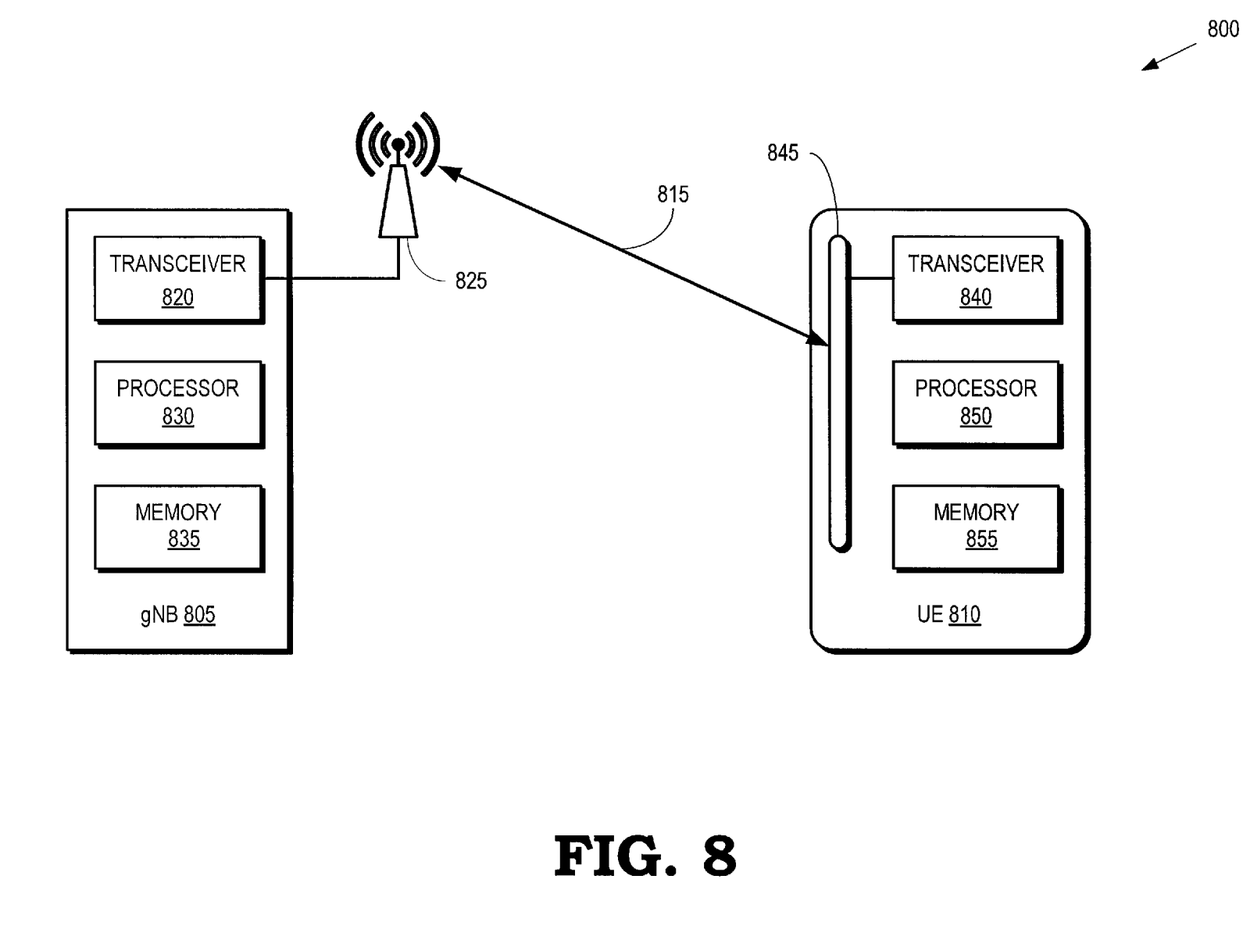
FIG. 8 is a block diagram of a wireless communication system according to some embodiments.

FIG. 8 is a block diagram of a wireless communication system 800 according to some embodiments. The wireless communication system 800 is used to implement some embodiments of the wireless communication system 100 shown in FIG. 1. The wireless communication system 800 includes a base station 805 and the user equipment 810, which are configured to support communication over an air interface 815 using corresponding subsets of beams supported by the base station 805 and the user equipment 810, respectively.

The base station 805 includes a transceiver 820 that is coupled to an antenna 825. The transceiver 820 is configured to transmit messages or signals on downlink channels over the air interface 815. The transceiver 820 is also configured to receive messages or signals on uplink channels of the air interface 815. The base station 805 includes memory 830 for storing information such as processor instructions, data for transmission, received data, and the like. A processor 835 is used to process information for transmission, process received information, or perform other operations as discussed herein, e.g., by executing instructions stored in the memory 830. Some embodiments of the transceiver 820, the memory 830, and the processor 835 are configured to perform embodiments of the method 700 shown in FIG. 7, as well as other operations discussed herein with regard to FIGS. 1-6.

The user equipment 810 includes a transceiver 840 that is coupled to an antenna 845. The transceiver 840 is configured to transmit messages or signals on downlink channels over the air interface 815. The transceiver 840 is also configured to receive messages or signals on uplink channels of the air interface 815. The user equipment 810 includes memory 850 for storing information such as processor instructions, data for transmission, received data, and the like. A processor 855 is used to process information for transmission, process received information, or perform other operations as discussed herein, e.g., by executing instructions stored in the memory 850. Some embodiments of the transceiver 840, the memory 850, and the processor 855 are configured to perform embodiments of the method 700 shown in FIG. 7, as well as other operations discussed herein with regard to FIGS. 1-6.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
accumulating, at a user equipment that supports a first set of beams, transmit power control commands to generate a plurality of accumulated correction factors for a corresponding plurality of closed-loop processes used for power control during communication between the user equipment and a base station that supports a second set of beams, wherein the user equipment is configured to use a first subset of the first set of beams during the communication and the base station is configured to use a second subset of the second set of beams during the communication, and wherein individual ones of the closed-loop processes correspond to one or more of the beams;
detecting, at the user equipment, a change in at least one of the first subset or the second subset; and
resetting, at the user equipment, closed-loop processes affected by the detected change and not resetting the closed loop processes not affected by the detected change.

2. The method of claim 1, wherein a number of the plurality of closed-loop processes is limited to a predetermined number.

3. The method of claim 1, wherein detecting the change comprises receiving signaling indicating that the base station has modified the second subset of the second set of beams.

4. The method of claim 3, wherein receiving the signaling comprises receiving signaling indicating a change in an association of at least one index of at least one reference signal with at least one index of at least one of the second set of beams.

5. The method of claim 1, wherein detecting the change comprises modifying, at the user equipment, the first subset of the first set of beams.

6. The method of claim 5, wherein resetting the at least one accumulated correction factor comprises resetting the at least one accumulated correction factor without notifying the base station.

7. The method of claim 1, wherein resetting the at least one accumulated correction factor comprises setting the at least one accumulated correction factor to a corresponding predetermined initial value, and wherein the method further comprises modifying the at least one accumulated correction factor based on transmit power control commands received subsequent to the reset.

8. A user equipment, comprising:
a memory including executable instructions; and
one or more processors,
wherein the memory and the executable instructions are configured, with the one or more processors, to cause the user equipment to:
accumulate transmit power control commands to generate a plurality of accumulated correction factors for a corresponding plurality of closed-loop processes used for power control during communication between the user equipment and a base station, wherein the user equipment supports a first subset of a first set of beams and the base station supports a second subset of a second set of beams, and wherein individual ones of the closed-loop processes correspond to one or more of the beams;
detect a change in at least one of the first subset or the second subset; and
reset closed-loop processes affected by the detected change and not resetting the closed loop processes not affected by the detected change.

9. The user equipment of claim 8, wherein a number of the plurality of closed-loop processes is limited to a predetermined number.

10. The user equipment of claim 8, further comprising: a transceiver configured to receive signaling indicating that the base station has modified the second subset of the second set of beams, and wherein the memory and the executable instructions are further configured, with the one or more processors, to cause the user equipment detect the change based on the signaling.

11. The user equipment of claim 10, wherein the transceiver is configured to receive signaling indicating a change in an association of at least one index of at least one reference signal with at least one index of at least one of the second set of beams.

12. The user equipment of claim 8, wherein the memory and the executable instructions are further configured, with the one or more processors, to cause the user equipment to modify the first subset of the first set of beams.

13. The user equipment of claim 12, wherein the memory and the executable instructions are further configured, with the one or more processors, to cause the user equipment to reset the at least one accumulated correction factor without notifying the base station.

14. The user equipment of claim 8, wherein the memory and the executable instructions are further configured, with the one or more processors, to cause the user equipment to reset the at least one accumulated correction factor by setting the at least one accumulated correction factor to a corresponding predetermined initial value and to modify the accumulated correction factor based on transmit power control commands received subsequent to the reset.

15. A non-transitory computer readable storage medium comprising software encoded thereon that, when executed by a user equipment, causes the user equipment to perform at least:
accumulating, at a user equipment that supports a first set of beams, transmit power control commands to generate a plurality of accumulated correction factors for a corresponding plurality of closed-loop processes used for power control during communication between the user equipment and a base station that supports a second set of beams, wherein the user equipment is configured to use a first subset of the first set of beams during the communication and the base station is configured to use a second subset of the second set of beams during the communication, and wherein individual ones of the closed-loop processes correspond to one or more of the beam;

detecting, at the user equipment, a change in at least one of the first subset or the second subset; and resetting, at the user equipment, closed-loop processes affected by the detected change and not resetting the closed loop processes not affected by the detected change.

16. The computer readable storage of claim 15, wherein a number of closed-loop processes in the plurality of closed-loop processes is limited to a predetermined number.

17. The computer readable storage of claim 15, wherein detecting the change comprises detecting the change in a beam associated with the one of the plurality of the closed-loop processes, and wherein resetting the at least one of the plurality of accumulated correction factors comprises resetting the one of the plurality of accumulated correction factors associated with the one of the plurality of closed-loop processes and not resetting other ones of the plurality of accumulated correction factors associated with others of the plurality of closed-loop processes.

18. The method of claim 1, wherein the resetting comprises:

resetting any ones of the plurality of accumulated correction factors associated with corresponding closed-loop processes affected by the detected change and not resetting any other ones of the plurality of accumulated correction factors associated with corresponding closed-loop processes not affected by the detected change.

19. The method of claim 1 wherein the resetting comprises resetting closed-loop processes affected by the detected change for the corresponding one or beams in the first or second subset that were changed and not resetting the closed loop processes not affected by the detected change for the one or beams in the first or second subset that were not changed.

20. The method of claim 1, wherein:

individual ones of the closed-loop processes correspond to one or more individual pairs of beams from the first set of beams and the second set of beams; and resetting comprises resetting closed-loop processes for pairs of beams affected by the detected change and not resetting the closed loop processes for pairs of beams not affected by the detected change.

* * * * *